(12) United States Patent
Tang

(10) Patent No.: US 11,460,328 B2
(45) Date of Patent: ***Oct. 4, 2022

(54) DISTANCE MEASURING DEVICE AND METHOD THEREOF FOR SEEKING DISTANCE MEASURING STARTING POINT

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 285 days.

This patent is subject to a terminal disclaimer.

(21) Appl. No.: 16/851,020

(22) Filed: Apr. 16, 2020

(65) Prior Publication Data

US 2020/0240815 A1 Jul. 30, 2020

Related U.S. Application Data

(63) Continuation of application No. 15/038,395, filed as application No. PCT/CN2014/091851 on Nov. 21, 2014, now Pat. No. 1,066,332.

(30) Foreign Application Priority Data

Nov. 21, 2013 (CN) .......................... 201310593673.8

(51) Int. Cl.
*G01D 5/347* (2006.01)
*G01C 3/08* (2006.01)

(52) U.S. Cl.
CPC ............. *G01D 5/3473* (2013.01); *G01C 3/08* (2013.01)

(58) Field of Classification Search
CPC ...... G01D 5/3473; G01C 3/08; G01C 15/002; G01S 17/42; G01S 17/89; G01S 7/4813;

(Continued)

(56) References Cited

U.S. PATENT DOCUMENTS 4,259,591 A 3/1981 Morris et al.
4,364,002 A 12/1982 Suzuki et al.
(Continued)

FOREIGN PATENT DOCUMENTS

CN 1381340 A 11/2002
CN 101226067 A 7/2008
(Continued)

OTHER PUBLICATIONS

International Search Report in PCT application PCT/CN2014/091851 dated Feb. 4, 2015.

(Continued)

*Primary Examiner* — Yuqing Xiao
*Assistant Examiner* — Amir J Askarian
(74) *Attorney, Agent, or Firm* — Maschoff Brennan

(57) ABSTRACT

A distance measuring device includes a motor, a control box and a code discs which are relative rotate driven by the motor. A point position tooth is comprised on the code disc. The control box comprises a distance measuring unit, a detection part and a control unit. The detection part comprises a light emitter and a light receiver which are correspondingly arranged. The control box is rotated relative to the code disc, so that the point position tooth passes through a corresponding position between the light emitter and the light receiver; the control unit receives the signal output of the light receiver, judges the information on alignment status of the point position tooth with the corresponding position, and sends a start or stop operation instruction to the distance measuring unit on the basis of the status information. A method for seeking a distance measuring starting point is also provided.

20 Claims, 7 Drawing Sheets

(58) Field of Classification Search
CPC ........ G01S 7/4817; G01S 17/08; G01S 17/66;
G01S 7/4808; G01S 7/4811; G01S
7/4818; G01S 7/491; A47L 11/4002;
A47L 2201/00; G01B 11/03; G05D
1/0219; G05D 1/024; G05D 2201/0203;
G06F 17/40; G16Z 99/00
See application file for complete search history.

(56) References Cited

U.S. PATENT DOCUMENTS

| | | | |
|---|---|---|---|
| 4,473,898 A | 9/1984 | Ono | |
| 4,498,764 A | 2/1985 | Bolkow et al. | |
| 4,560,271 A | 12/1985 | Fumio | |
| 5,747,703 A | 5/1998 | Pisson et al. | |
| 5,848,485 A | 12/1998 | Anderson et al. | |
| 6,093,928 A | 7/2000 | Ohtomo et al. | |
| 6,342,846 B1 | 1/2002 | Argentieri | |
| 6,447,189 B1 | 9/2002 | Omura | |
| 6,732,826 B2 * | 5/2004 | Song | A47L 9/2805 701/28 |
| 6,871,037 B1 | 3/2005 | Pierel et al. | |
| 2001/0027973 A1 | 10/2001 | Michelmann | |
| 2002/0044132 A1 | 4/2002 | Fish | |
| 2002/0153184 A1 | 10/2002 | Song et al. | |
| 2004/0040170 A1 | 3/2004 | Sanoner | |
| 2005/0043039 A1 | 2/2005 | Ohta et al. | |
| 2010/0156402 A1 | 6/2010 | Straubinger et al. | |
| 2011/0094115 A1 | 4/2011 | Schroter et al. | |
| 2012/0016629 A1 | 1/2012 | Kishikawa et al. | |
| 2013/0248698 A1 | 9/2013 | Ezaki et al. | |
| 2014/0019084 A1 | 1/2014 | Rolew et al. | |
| 2014/0293263 A1 * | 10/2014 | Justice | G01S 17/42 356/4.01 |
| 2015/0008802 A1 | 1/2015 | Fukuda | |

FOREIGN PATENT DOCUMENTS

| | | |
|---|---|---|
| CN | 101501454 A | 8/2009 |
| CN | 101738211 A | 6/2010 |
| CN | 101885110 A | 11/2010 |
| CN | 203811190 U | 9/2014 |
| JP | H08313298 A | 11/1996 |
| JP | 2012073216 A | 4/2012 |
| JP | 2012242189 A | 12/2012 |
| WO | 2012089366 A1 | 7/2012 |

OTHER PUBLICATIONS

Written Opinion in PCT application PCT/CN2014/091851 dated Feb. 4, 2015.

* cited by examiner

Along with the rotating of the motor, the control box in the distance measuring device rotates relative to the code disc, so that the point position tooth (151A) passes through a corresponding position between the light emitter and the light receiver; when the point position tooth is aligned with the corresponding position, the light receiver outputs a high level, otherwise the light receiver outputs a low level; and as the control box rotates a circle relative to the code disc, the light receiver outputs signals to the control unit.

100

The control unit (140) detects and recognizes the signals and identifies an status information on alignment of the point position tooth (151A) with the corresponding position; when the status information is detected at the first time, the control unit sends a start operation instruction to the distance measuring unit (142); and when the status information is detected at the second time, the control unit sends a stop operation instruction to the distance measuring unit.

| Along with the rotating of the motor, the control box in the distance measuring device rotates relative to the code disc, so that the point position tooth (151A) and the equidistant tooth (151) pass through a corresponding position between the light emitter and the light receiver; when the point position tooth or the equidistant tooth is just located in the corresponding position, the light receiver outputs a high level, otherwise the light receiver outputs a low level; and as the control box rotates a circle relative to the code disc, the light receiver outputs waves with square waveforms, including several equal-pitch square waves and one narrow-pitch square wave or wide-pitch square wave, to the control unit. | 100' |

| The control unit (140) detects and recognizes the waveforms; when the narrow-pitch square wave or wide-pitch square wave is detected at the first time, the control unit sends a start operation instruction to the distance measuring unit (142); and when the narrow-pitch square wave or wide-pitch square wave is detected at the second time, the control unit sends a stop operation instruction to the distance measuring unit. | 200' |

FIG. 10

DISTANCE MEASURING DEVICE AND METHOD THEREOF FOR SEEKING DISTANCE MEASURING STARTING POINT

FIELD OF THE INVENTION

The present invention relates to a distance measuring device and a method for seeking a distance measuring starting point with the same, belonging to the technical field of laser measuring instruments.

BACKGROUND OF THE PRIOR ART

In the prior art, the patent document of CN 101885110A discloses a rotational position detecting device, which adopts two rotators with different periods of rotation. The rotators are provided with one or more claws and provided with corresponding claw sensors so as to detect the rotation number and rotation angle. As a result of providing multiple rotators, the manufacturing costs of the detecting device are increased, and increased components in turn raise the costs for adjustment and maintenance inevitably.

SUMMARY OF THE INVENTION

In view of the above technical problems in the prior art, the present invention intends to provide a distance measuring device and a method for seeking a distance measuring starting point with the same, using a synchronous scanning mode of a code disc to obtain scan data and determining the starting point based on the output waveforms of the code disc. The device as a whole is of compact structure, clever design and high sensitivity.

The technical problems of the present invention are solved through technical solutions as follows.

A distance measuring device comprises a motor, a control box and a code disc, wherein relative rotation occurs between the control box and the code disc under the driving of the motor; a point position tooth is provided on the code disc; the control box comprises a distance measuring unit, a detection part and a control unit; the detection part comprises a light emitter and a light receiver which are arranged correspondingly; the control box and the code disc rotate relative to each other so that the point position tooth passes through a corresponding position between the light emitter and the light receiver; and the control unit receives the signal output from the light receiver, identifies the status information on alignment of the point position tooth with the corresponding position, and sends a start or stop operation instruction to the distance measuring unit based on the status information.

In order to facilitate the fixing of the code disc, the distance measuring device further comprises a base on which the code disc is fixed.

In order to allow the control box and the code disc to rotate relative to each other, a motor pulley is provided at the output end of the motor, and an O-ring is provided on the periphery of the motor pulley and the control box; and a bearing is connected to the central portion of the base, the outer ring of the bearing is fixed to the base and the inner ring of the bearing is fixed to the control box.

The invention further provides a method for seeking a distance measuring starting point with the above-mentioned distance measuring device, the method comprising:

step 100: along with the rotating of the motor, the control box in the distance measuring device rotates relative to the code disc, so that the point position tooth passes through a corresponding position between the light emitter and the light receiver; when the point position tooth is aligned with the corresponding position, the light receiver outputs a high level, otherwise the light receiver outputs a low level; and as the control box rotates a circle relative to the code disc, the light receiver outputs signals to the control unit; and step 200: the control unit (140) detects and recognizes the signals and identifies an status information on alignment of the point position tooth (151A) with the corresponding position; when the status information is detected at the first time, the control unit sends a start operation instruction to the distance measuring unit (142); and when the status information is detected at the second time, the control unit sends a stop operation instruction to the distance measuring unit.

In order to perform signal recognition more accurately, a plurality of equidistant teeth are provided on the circumference of the code disc evenly, and the tooth width of the point position tooth is smaller or larger than that of the equidistant tooth; and the control box and the code disc rotate relative to each other, so that the point position tooth and the equidistant tooth pass through a corresponding position between the light emitter and the light receiver.

The light receiver outputs waves of square waveforms to the control unit, and the control unit identifies the status information on alignment of the point position tooth with the corresponding position on the basis of the waveforms and sends a start or stop operation instruction to the distance measuring unit on the basis of the status information.

In order to simplifying structure while ensuring accuracy, the total number of the point position tooth and the equidistant tooth provided on the circumference of the code disc is 5 to 15. Specifically, the code disc comprises one point position tooth and fourteen equidistant teeth, and in clockwise direction, the angle between left edges of two adjacent equidistant teeth is 24°; the angle between left and right edges of the point position tooth is 6°, and the angle between the right edge of the point position tooth and the left edge of the adjacent equidistant tooth on its right side is 18°; and the angle between left and right edges of each equidistant tooth is 12°.

The invention further provides a method for seeking a distance measuring starting point with the above-mentioned distance measuring device, the method comprising:

step 100': along with the rotating of the motor, the control box in the distance measuring device rotates relative to the code disc, so that the point position tooth and the equidistant tooth pass through a corresponding position between the light emitter and the light receiver; when the point position tooth or the distance measuring tooth is just located in the corresponding position, the light receiver outputs a high level, otherwise the light receiver outputs a low level; and as the control box rotates a circle relative to the code disc, the light receiver outputs waves with square waveforms, including several equal-pitch square waves and a first or narrow-pitch square wave or a second or wide-pitch square wave in which the first square wave is narrower than the second square wave, to the control unit; and step 200': the control unit (140) detects and recognizes the waveforms; when the narrow-pitch or first square wave or wide-pitch or second square wave is detected at the first time, the control unit sends a start operation instruction to the distance measuring unit (142); and when the narrow-pitch or first square wave or wide-pitch or second square wave is detected at the second time, the control unit sends a stop operation instruction to the distance measuring unit.

From the above, the invention uses a synchronous scanning mode of a code disc to obtain scan data and identifies the starting point on the basis of the output waveforms of the code disc. The device as a whole is of compact structure, clever design and high sensitivity.

Hereinafter, the technical solutions of the present invention will be described in detail in combination with the attached drawings and some specific embodiments.

DESCRIPTION OF ATTACHED DRAWINGS

FIG. 9 is a flowchart showing a method for seeking a distance measuring starting point with the distance measuring device according to the first embodiment of the present invention; and FIG. 10 is a flowchart showing a method for seeking a distance measuring starting point with the distance measuring device according to the second embodiment of the present invention.

DETAILED DESCRIPTION OF PREFERRED EMBODIMENTS

The First Embodiment

Figure 1:
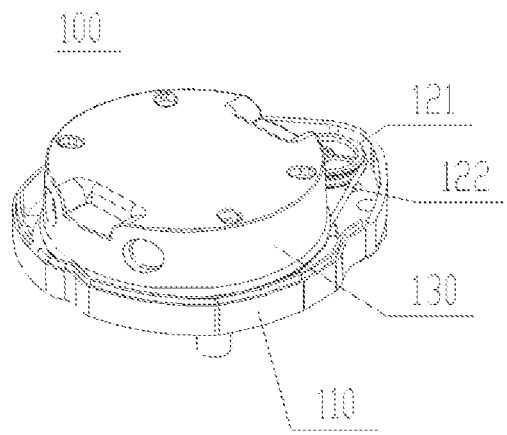
FIG. 1 is a schematic diagram of the overall structure of the appearance of the laser distance measuring sensor according to the present invention.
Figure 2:
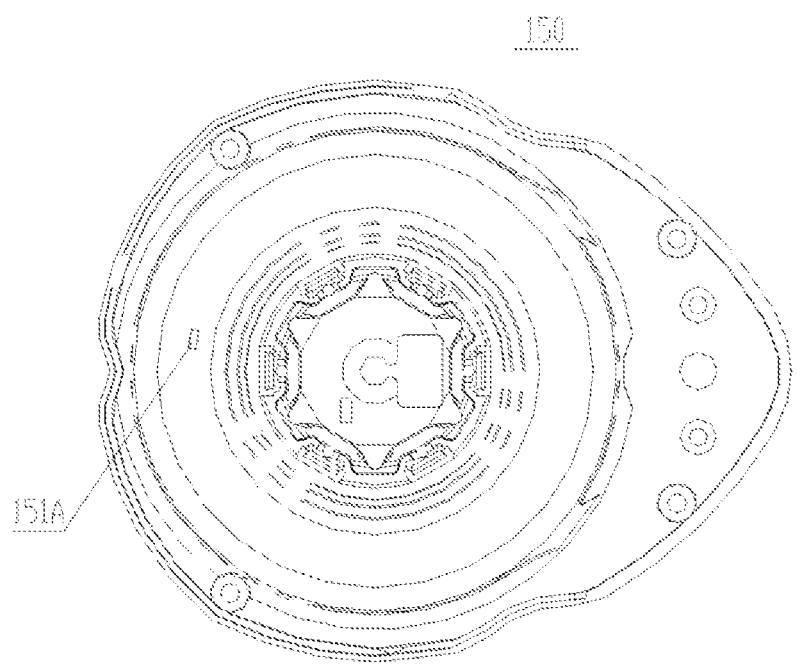
FIG. 2 is a schematic diagram of the structure of code disc according to the first embodiment of the present invention.
Figure 3:
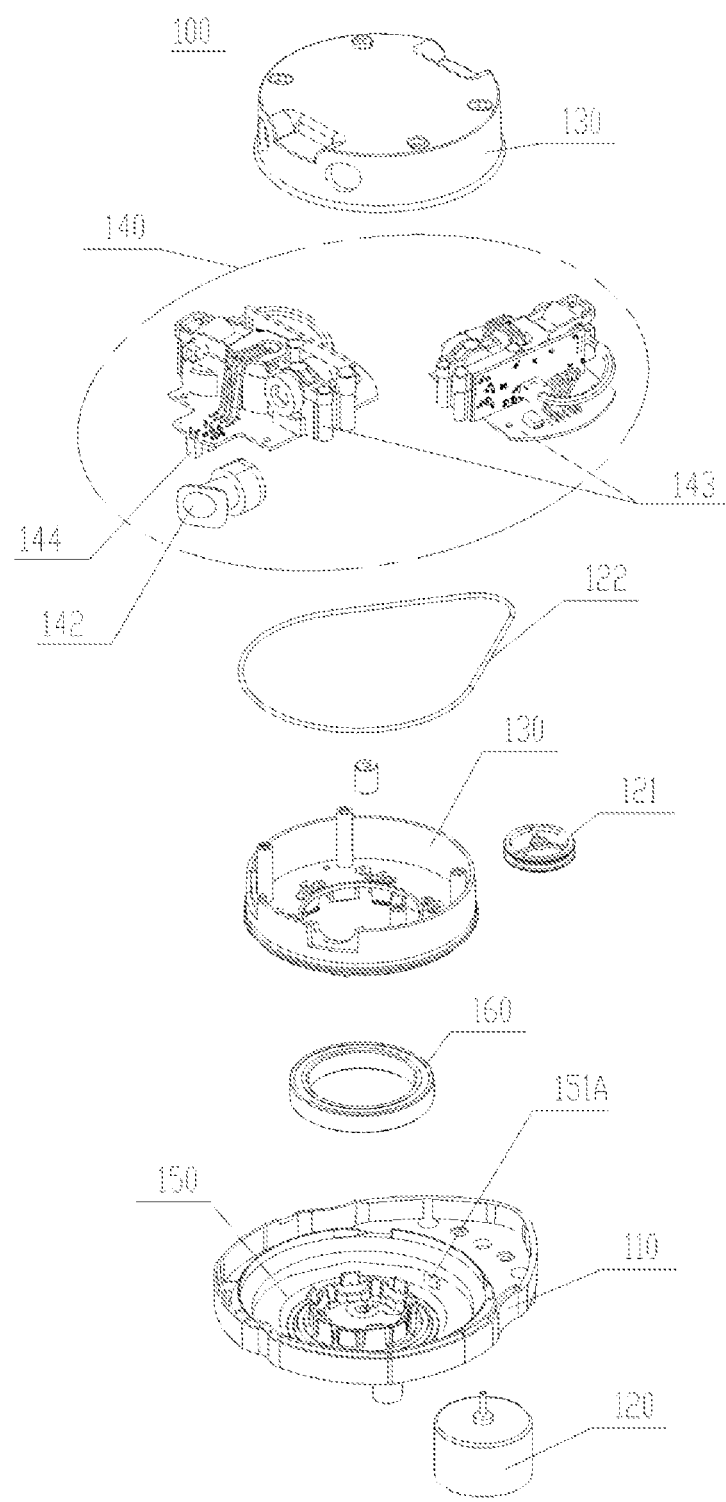
FIG. 3 is an internal structure diagram of the laser distance measuring sensor according to the present invention.

FIG. 1 is a schematic diagram of the overall structure of the appearance of laser distance measuring sensor according to the present invention; FIG. 2 is a schematic diagram of the structure of code disc according to the first embodiment of the present invention; and FIG. 3 is an internal structure diagram of the laser distance measuring sensor according to the present invention. As shown in FIGS. 1 to 3, the present invention provides a distance measuring device 100 comprising a base 110. A motor 120 is provided on the base 110 and drives a control box 130 rotatably connected onto the base 110. A code disc 150 is integrally provided on the base 110. The control box 130 and the code disc 150 can rotate relative to each other under the driving by the motor 120. A point position tooth 151A is provided on the code disc 150. The control box 130 comprises a distance measuring unit 142, a detection part 144 and a control unit 140. The detection part 144 comprises a light emitter 1440 and a light receiver 1441 which are arranged correspondingly. The control box 130 and the code disc 150 rotate relative to each other, so that the point position tooth 151A passes through a corresponding position just between the light emitter and the light receiver. The control unit 140 receives the signal output from the light receiver, identifies a status information on alignment of the point position tooth 151A with the corresponding position, and sends an operation instruction for start or stop to the distance measuring unit 142 based on the status information. The distance measuring unit may be a camera for capturing a spatial image of ambient environment. As shown in FIG. 3, the control unit 140 further comprises a circuit board component 143 in which a horizontal circuit board and a vertical circuit board are included.

Figure 4:
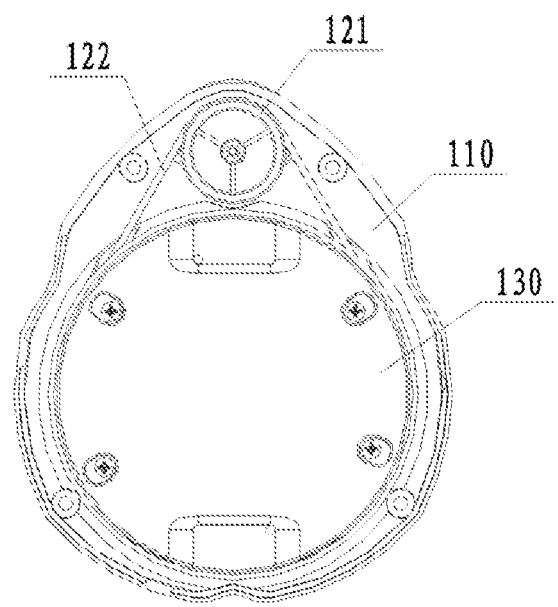
FIG. 4 is a top view of the laser distance measuring sensor according to the present invention.
Figure 5:
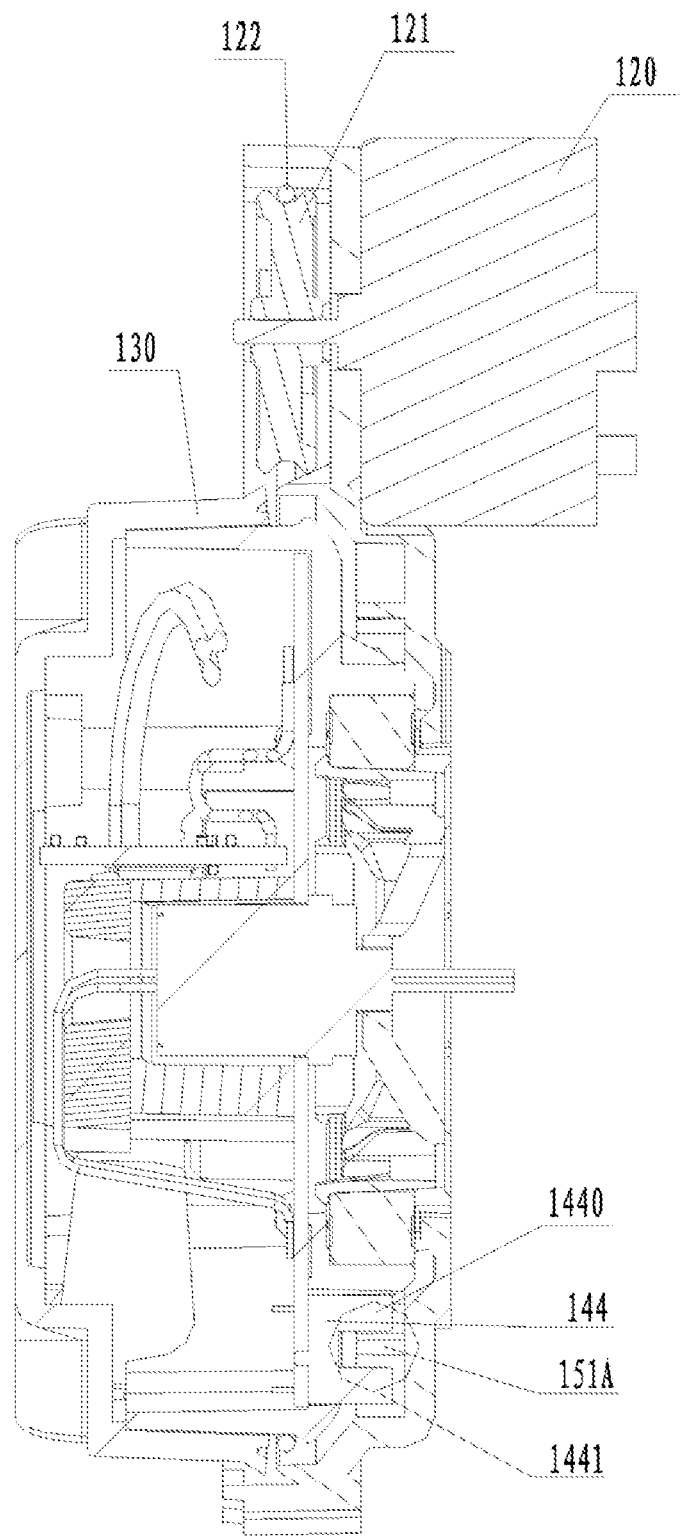
FIG. 5 is a side cross-sectional view of the laser distance measuring sensor according to the present invention.

FIG. 4 is a top view of the laser distance measuring sensor according to the present invention; and FIG. 5 is a side sectional view of the laser distance measuring sensor according to the present invention. As shown in FIGS. 4 and 5 in combination with FIG. 3, in this embodiment, in order to allow the control box 130 and the code disc 150 to rotate relative to each other, a motor pulley 121 is provided at the output end of the motor 120, and an O-ring 122 is provided on the periphery of the motor pulley 121 and the control box 130. The central portion of the base 110 is connected to a bearing 160, the outer ring of which is fixed to the base 110 and the inner ring of which is fixed to the control box 130. In this embodiment, the motor 120 drives the control box 130 via the motor pulley 121 and then the O-ring 122 to rotate with respect to the code disc 150 on the base 110. Obviously, a corresponding structure may also be configured such that the code disc can rotate while the control box is fixed as needed.

As shown in FIG. 9 with reference to FIGS. 1 to 5, the first embodiment of the present invention further provides a method of using the above-mentioned distance measuring device to seek a distance measuring starting point, which comprises step 100 and step 200. In the step 100, the control box 130 in the distance measuring device is rotated by the motor 120 with respect to the code disc 150, so that the point position tooth 151A passes through the corresponding position between the light emitter 1440 and the light receiver 1441; when the point position tooth 151A is aligned with the corresponding position, light emitted from the light emitter 1440 is blocked by the point position tooth 151A and thus cannot be received by the light receiver 1441, and in this case the light receiver 1441 outputs a high level; when the point position tooth 151A is not in the corresponding position, light emitted from the light emitter 1440 is not blocked by the point position tooth 151A, and the light receiver 1441 receives the light, and in this case the light receiver 1441 outputs a low level. As the control box 130 rotates a circle relative to the code disc 150, the light receiver 1441 outputs signals to the control unit 140. In the step 200, the control unit 140 detects and recognizes the signals and identifies an status information on alignment of the point position tooth 151A with the corresponding position; when the status information is detected at the first time, the control unit 140 sends a start operation instruction to the distance measuring unit 142; and when the status information is detected at the second time, the control unit 140 sends a stop operation instruction to the distance measuring unit 142. Thereby, the ambient environment can be scanned all around and the scan start point can be determined.

Figure 6:
FIG. 6 is a waveform diagram according to the first embodiment of the present invention.

FIG. 6 is a waveform diagram according to the first embodiment of the present invention. FIG. 6 is a waveform graph of the square wave outputted during the scan as described above, in which the point M is the scan start point and the point M' is the scan stop point.

The Second Embodiment

Figure 7:
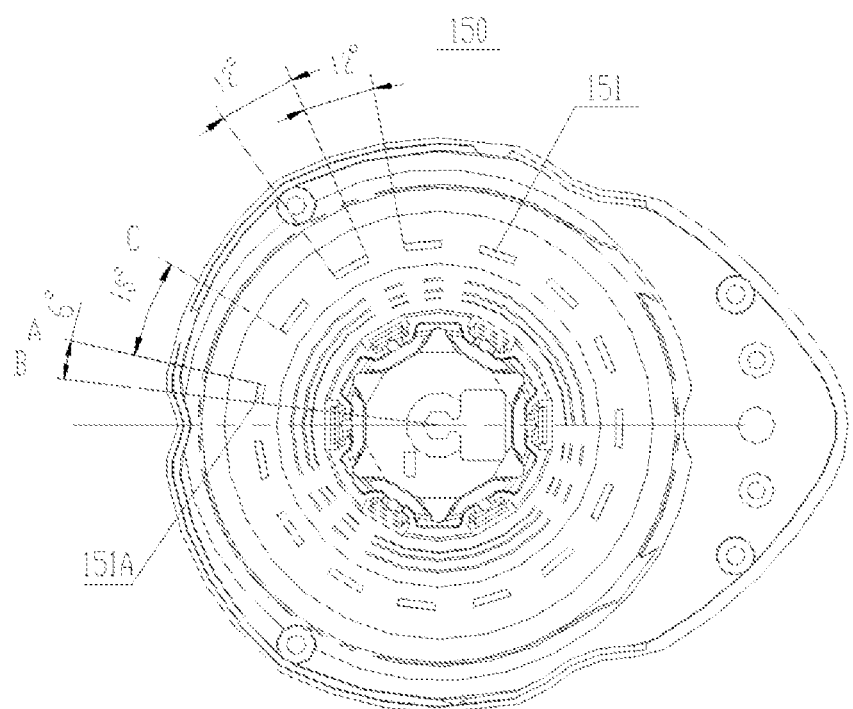
FIG. 7 is a schematic diagram of the structure of code disc according to the second embodiment of the present invention.

FIG. 7 is a schematic diagram of the structure of code disc according to the second embodiment of the present invention. As shown in FIG. 7, in order to perform signal recognition with higher accuracy, a plurality of equidistant teeth 151 are provided on the circumference of the code disc 150 evenly, and the tooth width of the point position tooth 151A is smaller or larger than that of the equidistant tooth 151. The control box 130 and the code disc 150 rotate relative to each other, so that the point position tooth 151A and the equidistant tooth 151 pass through the corresponding position between the light emitter 1440 and the light receiver 1441. The light receiver 1441 outputs waves with square waveforms to the control unit 140, and the control unit 140 identifies the status information on alignment of the point position tooth 151A with the corresponding position based on such waveforms and sends a start or stop operation instruction to the distance measuring unit 142 according to the status information. In consideration of both sensitivity and work efficiency, the total number of the point position tooth 151A and the equidistant teeth 151 provided on the circumference of the code disc 150 may be 5 to 15.

As shown in FIG. 7, in this embodiment, the total number of the point position tooth 151A and the equidistant teeth 151 provided on the circumference of the code disc is 15. Specifically, the code disc 150 is provided with one point position tooth 151A and fourteen equidistant teeth 151. In clockwise direction, the angle between the left edges of two adjacent equidistant teeth is 24°; the angle between left and right edges of the point position tooth is 6°; the angle between the right edge of the point position tooth and the left edge of an adjacent equidistant tooth on the right side is 18°; and the angle between the left and right edges of each equidistant tooth is 12°. As shown in FIG. 7, in this embodiment, fifteen teeth 151 are provided on the circumference of the code disc 150 evenly, the angle interval between the left edges of two adjacent teeth is 24°, one of the fifteen teeth is a point position tooth 151A with an angle interval of 6° between its left and right edges, and the tooth width of the point position tooth is slightly smaller than that of other teeth (also be called as distance measuring teeth). The angle interval between the right edge of the point position tooth and the left edge of an adjacent tooth on the right side is 18°. As shown in FIG. 7, provided that the center of the code disc 150 is a point O, the angle of ∠AOB is 6°, the angle of ∠AOC is 18° and each of the angle intervals between other teeth is 12°. With the position B as a start point of 0°, the code disc 150 could rotate counterclockwise during scanning, and one degree (°) is scanned every 555.5 µs, i.e., one circle is scanned every 0.2 s and five circles are scanned per 1 s.

Figure 8:
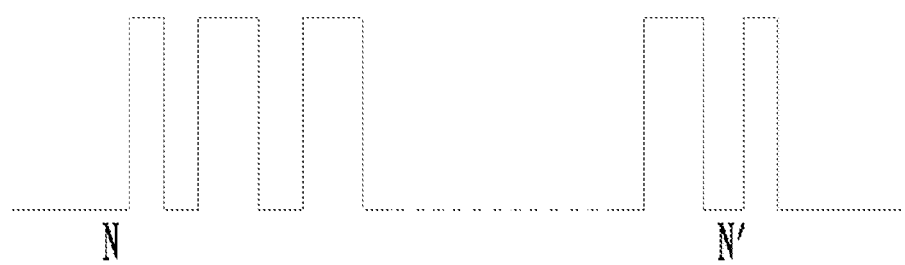
FIG. 8 is a waveform diagram according to the second embodiment of the present invention.

FIG. 8 is a waveform diagram according to the second embodiment of the present invention. As shown in FIG. 10 in combination with FIGS. 7 and 8, in this embodiment, a method of using the above-mentioned distance measuring device to seek a distance measuring starting point comprises:

Step 100': The control box 130 in the distance measuring device is rotated along with the motor 120 relative to the code disc 150, so that the point position tooth 151A and the equidistant tooth 151 pass through the corresponding position between the light emitter 1440 and the light receiver 1441. Similarly, when the point position tooth 151A or the equidistant tooth 151 is aligned with the corresponding position, light emitted from the light emitter 1440 is blocked by the point position tooth 151A or the equidistant tooth 151 and cannot be received by the light receiver 1441. In this instance, the light receiver 1441 outputs a high level. When the point position tooth 151A or the equidistant tooth 151 is not in the corresponding position, light emitted from the light emitter 1440 is not blocked by the point position tooth 151A or the equidistant tooth 151 and can be received by the light receiver 1441. In this instance, the light receiver 1441 outputs a low level. As the control box 130 rotates a circle relative to the code disc 150, the light receiver 1441 outputs waves with square waveforms, which include several equal-pitch square waves and a first or narrow-pitch square wave or a second or wide-pitch square wave in which the first square wave is narrower than the second square wave due to that the point position tooth 151A and the equidistant tooth 151 are different in width, to the control unit 140; and Step 200': The control unit detects and recognizes the waveforms; when the first square wave or the second square wave is detected at the first time, the control unit sends a start operation instruction to the distance measuring unit; and when the first square wave or the second square wave is detected at the second time, the control unit sends a stop operation instruction to the distance measuring unit.

As shown in FIG. 8, there are a total of 15 teeth provided on the code disc 150, and amongst them, the length of the point position tooth is different from that of the equidistant tooth. Scan data information is obtained by scanning these teeth with dot laser. It is necessary to seek out the start point of 0° after each circle of scanning. The code disc scans counterclockwise, during which the code disc will output one square-wave pulse depending on the position and length of every single tooth. In this embodiment, as a result of the existence of the special narrow tooth with a different outputted waveform from the outputted waveforms of other wide teeth, the distance measuring unit 142 is activated at the position of point N in FIG. 8 (i.e., this point is set as the start point of 0°), the laser distance measuring sensor obtains the distance information on a two dimensional section by scanning one circle by 360°, and the scanning is stopped at the point N' as the stop point. Thereby, the start point of 0° is sought out so as to perform synchronization after every scanning circle.

The Third Embodiment

However, the number of teeth provided on the circumference of the code disc 150 evenly is not limited to fifteen (in such case, one fifteenth of 360° is used as a measurement unit) in the second embodiment. In the second embodiment, five teeth are evenly provided on the circumference of the code disc 150, and accordingly in this embodiment, every measurement unit corresponds to an angle of 72° and the initial rotational rate N1 is set to 15 rps correspondingly. The difference between the present embodiment and the first embodiment is only in that the numbers of teeth to be provided are different and therefore the measurement units are different. Since other technical features of this embodiment are substantially same as that of the first embodiment mentioned above, please refer to relevant contents above and not repeat them herein.

Obviously, in addition to the modes for providing teeth described in the above two embodiments, it may be possible to provide thirty six teeth, i.e., the 360 degree circle of code disc 150 might be further divided into thirty six measurement units or more. In theory, there are more teeth, the adjustment frequency is higher and accordingly the accuracy and precision of measurement are higher, while the overall configuration of the device is more complicated; and on the contrary, there are less teeth, the adjustment frequency is lower and accordingly the accuracy and precision of measurement are lower, while the overall configuration of the device is relatively simple, reducing costs. In order to balance manufacturing costs and precision, the structure with fifteen teeth evenly provided in the first embodiment actually ensures both accuracy and precision and allow the overall configuration of the device less complicated.

In conclusion, the invention provides a distance measuring device and a method for seeking a distance measuring starting point with the same, in which the distance measuring device adopts a single code disc structure, uses a synchronous scanning mode of the code disc to obtain scan data, and identifies the starting point based on the output waveforms of the code disc; the scan component obtains distance information on a two dimensional section by scanning one circle by 360°, and the start point of 0° is sought out automatically so as to perform synchronization after each circle of scanning. The device in whole has compact structure, ingenious design and high sensitivity.

What is claimed is:

1. A distance measuring device, comprising a motor, a control box and a code disc; wherein,
    the control box and the code disc rotate relative to each other under the driving of the motor;
    a point position tooth is provided on the code disc;
    the control box comprises a distance measuring unit, a detection part and a control unit;
    the detection part comprises a light emitter and a light receiver arranged correspondingly;
    the point position tooth passes through a corresponding position between the light emitter and the light receiver when the control box and the code disc rotate relative to each other;
    the light receiver output a signal whether the point position tooth is aligned to the corresponding position to the control unit; and
    the control unit controls the distance measuring unit to operate or not according to the signal.

2. The device according to claim 1, comprising a base; wherein,
    the code disc is fixed on base, a motor pulley is provided at an output end of the motor, and an O-ring is provided on a periphery of the motor pulley and the control box; and a bearing is connected to a central portion of the base, an outer ring of the bearing is fixed to the base and an inner ring of the bearing is fixed to the control box.

3. The device according to claim 1, wherein, a plurality of equidistant teeth are provided on a circumference of the code disc evenly, and a tooth width of the point position tooth is smaller or larger than that of the equidistant teeth; and the point position tooth and the equidistant teeth pass through the corresponding position when the control box and the code disc rotate relative to each other.

4. The device according to claim 3, wherein, the code disc comprises one point position tooth and fourteen equidistant teeth, and in clockwise direction, the angle between left edges of two adjacent equidistant teeth is 24°; the angle between left and right edges of the point position tooth is 6°, and the angle between the right edge of the point position tooth and the left edge of an adjacent equidistant teeth on the right side of the point position tooth is 18°; and the angle between the left and right edges of each equidistant tooth is 12°.

5. The device according to claim 3, wherein, the control unit identifies status information according to the signal, and sends a start operation instruction or a stop operation instruction to the distance measuring unit according to the status information; and wherein, the status information indicates that the point position tooth is aligned to the corresponding position to the control unit.

6. The device according to claim 5, wherein, the control unit sends the start operation instruction to the distance measuring unit when the status information is identified for a first time, and the control unit sends the stop operation instruction to the distance measuring when the status information is identified for a second time.

7. The device according to claim 6, wherein, the light receiver outputs waves with square waveforms to the control unit, and the control unit identifies the status information according to levels and widths of the waves.

8. The device according to claim 7, wherein, the light receiver outputs a wave with a first level and a first width to the control unit when the point position tooth is aligned to the corresponding position, the light receiver outputs a wave with a first level and a second width to the control unit when one of the equidistant teeth is aligned to the corresponding position, otherwise outputs a second level to the control unit; and the control unit identifies the status information according to the wave with the first level and the first width.

9. A method for seeking a distance measuring starting point with the distance measuring device according to claim 3, comprising:
    outputting, by the light receiver, a signal whether the point position tooth is aligned to the corresponding position to the control unit when the control box and the code disc rotate relative to each other, to the control unit; and
    controlling, by the control unit, the distance measuring unit to operate or not according to the signal.

10. The method according to claim 9, the controlling, by the control unit, the distance measuring unit to operate or not according to the signal, comprises:
    identifying, by the control unit, status information according to the signal; and
    sending, by the control unit, a start operation instruction or a stop operation instruction to the distance measuring unit according to the status information; and
    wherein, the status information indicates that the point position tooth is aligned to the corresponding position to the control unit.

11. The method according to claim 10, wherein, the controlling, by the control unit, the distance measuring unit to operate or not according to the signal, comprises:
    sending, by the control unit, the start operation instruction to the distance measuring unit when the status information is identified for a first time; and
    sending, by the control unit, the stop operation instruction to the distance measuring when the status information is identified for a second time.

12. The method according to claim 11, wherein, the outputting, by the light receiver, a signal whether the point position tooth is aligned to the corresponding position to the control unit when the control box and the code disc rotate relative to each other, to the control unit, comprises:
    outputting, by the light receiver, waves with square waveforms to the control unit;
    and wherein, the controlling, by the control unit, the distance measuring unit to operate or not according to the signal, comprises:
    identifying, by the control unit, the status information according to levels and widths of the waves.

13. The method according to claim 12, wherein, the outputting, by the light receiver, a signal whether the point position tooth is aligned to the corresponding position to the control unit when the control box and the code disc rotate relative to each other, to the control unit, comprises:
    outputting, by the light receiver outputs, a wave with a first level and a first width to the control unit when the point position tooth is aligned to the corresponding position, or outputting a wave with a first level and a second width to the control unit when one of the equidistant teeth is aligned to the corresponding position, otherwise outputting a second level to the control unit;

and wherein, the controlling, by the control unit, the distance measuring unit to operate or not according to the signal, comprises:

identifying, by the control unit, the status information according to the wave with the first level and the first width.

14. The device according to claim 1, wherein, the control unit identifies status information according to the signal, sends a start operation instruction to the distance measuring unit when the status information is identified for a first time, and sends a stop operation instruction to the distance measuring when the status information is identified for a second time; and wherein, the status information indicates that the point position tooth is aligned to the corresponding position to the control unit.

15. The device according to claim 14, wherein, the light receiver outputs waves with square waveforms to the control unit, and the control unit identifies the status information according to levels of the waves.

16. The device according to claim 15, wherein, the light receiver outputs a first level to the control unit when the point position tooth is aligned to the corresponding position, otherwise outputs a second level to the control unit; and the control unit identifies the status information according to the first level.

17. A method for seeking a distance measuring starting point with the distance measuring device according to claim 1, comprising:

outputting, by the light receiver, a signal whether the point position tooth is aligned to the corresponding position to the control unit when the control box and the code disc rotate relative to each other, to the control unit; and controlling, by the control unit, the distance measuring unit to operate or not according to the signal.

18. The method according to claim 17, wherein, the controlling, by the control unit, the distance measuring unit to operate or not according to the signal, comprises:

identifying, by the control unit, status information according to the signal; and sending, by the control unit, a start operation instruction to the distance measuring unit when the status information is identified for a first time; and sending, by the control unit, a stop operation instruction to the distance measuring when the status information is identified for a second time;

and wherein, the status information indicates that the point position tooth is aligned to the corresponding position to the control unit.

19. The method according to claim 18, wherein, the outputting, by the light receiver, a signal whether the point position tooth is aligned to the corresponding position to the control unit when the control box and the code disc rotate relative to each other, to the control unit, comprises:

outputting, by the light receiver, waves with square waveforms to the control unit;

and wherein, the controlling, by the control unit, the distance measuring unit to operate or not according to levels of the signal, comprises:

identifying, by the control unit, the status information according to the waves.

20. The method according to claim 19, wherein, the outputting, by the light receiver, a signal whether the point position tooth is aligned to the corresponding position to the control unit when the control box and the code disc rotate relative to each other, to the control unit, comprises:

outputting, by the light receiver, a first level to the control unit when the point position tooth is aligned to the corresponding position, otherwise outputting a second level to the control unit;

and wherein, the controlling, by the control unit, the distance measuring unit to operate or not according to the signal, comprises:

identifying, by the control unit, the status information according to the first level.

* * * * *